US012059112B2

(12) United States Patent
Beaudry

(10) Patent No.: US 12,059,112 B2
(45) Date of Patent: Aug. 13, 2024

(54) CLEANING IMPLEMENT

(71) Applicant: Jonathan Beaudry, Quebec City (CA)

(72) Inventor: Jonathan Beaudry, Quebec City (CA)

( * ) Notice: Subject to any disclaimer, the term of this patent is extended or adjusted under 35 U.S.C. 154(b) by 0 days.

(21) Appl. No.: 17/354,681

(22) Filed: Jun. 22, 2021

(65) Prior Publication Data

US 2024/0016361 A1 Jan. 18, 2024

(51) Int. Cl.
*A47L 13/11* (2006.01)
*A47L 1/08* (2006.01)
*B25G 1/04* (2006.01)
*B25G 3/38* (2006.01)

(52) U.S. Cl.
CPC ................. *A47L 13/11* (2013.01); *A47L 1/08* (2013.01); *B25G 1/04* (2013.01); *B25G 3/38* (2013.01)

(58) Field of Classification Search
CPC .......... A47L 13/11; A47L 1/08; A47L 13/022; A47L 31/08; A47L 13/03; A47L 17/06; B25G 1/04; B25G 3/38; B08B 1/005; B60S 2001/3832
See application file for complete search history.

(56) References Cited

U.S. PATENT DOCUMENTS 1,716,171 A 6/1929 Horihata
3,766,591 A 10/1973 Soito
4,910,825 A 3/1990 Mauer
5,175,902 A 1/1993 Soren
5,539,949 A 7/1996 Stanton
6,931,690 B2 8/2005 Grant
7,000,282 B2 2/2006 Cox et al.
D782,271 S 3/2017 Harrington
10,065,611 B1 * 9/2018 Alonzo ..................... A47L 1/06
10,327,620 B2 6/2019 Tyroler et al.
10,441,120 B1 * 10/2019 Sgroi, Jr. ................. B25G 1/04
2006/0222438 A1 * 10/2006 Alexander .............. B08B 3/024 401/48
2018/0304866 A1 10/2018 Verbakel

FOREIGN PATENT DOCUMENTS

| | | | | |
|---|---|---|---|---|
| DE | 202004009880 | | 11/2004 | |
| EP | 192278 | | 9/1991 | |
| EP | 2984977 | | 2/2016 | |
| FR | 2969914 | A1 * | 7/2012 | ............... A47L 1/06 |
| GB | 269401 | | 4/1927 | |
| GB | 2429946 | A * | 3/2007 | ............... B25G 1/02 |
| JP | 11290247 | | 10/1999 | |
| WO | 2001058332 | | 8/2001 | |

* cited by examiner

*Primary Examiner* — Daniel J Colilla

(57) ABSTRACT

A cleaning implement in which a squeegee blade is linked to a handle through a resiliently deformable support arm so that the squeegee blade is movable relative to the handle. A distance between a handle longitudinal axis and the squeegee blade varies when the support arm deforms. The support arm facilitates application on the surface of a force within a predetermined range by the squeegee blade.

25 Claims, 3 Drawing Sheets

CLEANING IMPLEMENT

FIELD OF THE INVENTION

The present invention relates to the general field of implements, and is more particularly concerned with a cleaning implement, such as a cleaning implement having a squeegee blade mounted to a handle through a resiliently deformable support arm.

BACKGROUND

Window cleaning implements typically include a handle terminated at an upper end thereof with a transversally extending squeegee blade configured for cleaning a window pane. In many of these implements, a lower end of the handle is configured for engaging with an end of an extension pole or the like, for reaching elevated window panes to be cleaned.

Window cleaning requires that the right amount of pressure be applied on the window with the squeegee blade. Applying too much pressure can potentially force the blade leading edge of the cleaning tool to slightly bend or wave, thus leaving small traces or tracks of dust or window cleaning fluid on the window. Applying too little pressure will leave some of the cleaning water and dirt covering the window behind. This problem is compounded for tall window panes or glass walls, which may require moving the handle through a large range of angles relative to the surface to be cleaned. Applying the right pressure is even more difficult when the latter is attached at the end of an extension pole, while varying the angle thereof.

Furthermore the ergonomic or shape configuration of commonly used window cleaning implements can make substantially difficult the simple task of reaching the lower edge of the window pane to be cleaned, particularly when using an extension pole for cleaning an elevated window pane recessed in a window opening of a building.

Against this background, there exists a need in the industry to provide implements mitigating at least in part the above-noted disadvantages of existing implements. An object of the present invention is therefore to provide such implements.

SUMMARY OF THE INVENTION

In a broad aspect, there is provided a cleaning implement including an elongated squeegee blade; a handle; and a support arm extending between the squeegee blade and the handle, the support arm supporting the squeegee blade spaced apart from the handle. The support arm is resiliently deformable so that the squeegee blade is movable relative to the handle, a distance between the handle and the squeegee blade varying when the support arm deforms.

There may also be provided a cleaning implement wherein the support arm includes a handle mounting portion extending from the handle, a blade support portion, the squeegee blade being mounted to the blade support portion, and an intermediate portion extending therebetween, the intermediate portion including a bend.

There may also be provided a cleaning implement wherein the handle is elongated and defines longitudinally opposed handle proximal and distal ends, a handle longitudinal axis extending between the handle proximal and distal ends, the handle mounting portion extending along the handle, the handle mounting portion including an attached section and a detached section extending therefrom, the attached section being secured to the handle at a mounting location and the detached section being movable away from the handle with the attached section remaining attached to the handle by deforming the handle mounting portion, the detached section being closer to the handle proximal end than the mounting location, the intermediate portion extending from the detached section.

There may also be provided a cleaning implement wherein the support arm is movable between an unstressed configuration, a first deformed configuration, and a second deformed configuration, wherein the unstressed configuration is achieved in the absence of external forces on the window cleaning implement; in the first deformed configuration, the detached section abuts against the handle and the intermediate portion is deformed relative to the unstressed configuration so that the squeegee blade is closer to the handle longitudinal axis than in the unstressed configuration; and in the second deformed configuration, the detached section is at least in part spaced apart from the handle and the intermediate portion is deformed relative to the unstressed configuration so that the squeegee blade is closer to the handle longitudinal axis than in the unstressed configuration.

There may also be provided a cleaning implement wherein the mounting portion is substantially rectilinear.

There may also be provided a cleaning implement wherein the support and intermediate portions are angled relative to each other at their junction.

There may also be provided a cleaning implement further comprising a lock movable along the handle mounting portion to selectively adjust a length of the detached section by maintaining the handle mounting portion and the handle adjacent to each other at the lock.

There may also be provided a cleaning implement wherein the squeegee blade is removably mounted to the blade support portion.

There may also be provided a cleaning implement wherein the blade support portion is hinged to the intermediate portion and movable relative thereto over a predetermined movement range, a biasing element being provided between the blade support portion and the intermediate portion to bias the blade support portion towards an end point of the predetermined movement range.

There may also be provided a cleaning implement wherein the predetermined movement range is selectively adjustable.

There may also be provided a cleaning implement wherein the intermediate portion defines an intermediate portion distal end and an intermediate portion proximal end; the blade mounting portion and the intermediate portion overlap each other along part thereof; the blade support portion is fixed relative to the intermediate portion at a fixed location spaced apart from the intermediate portion distal end; the blade support portion and the intermediate portion are movable relative to each other at the intermediate portion distal end; and a biasing element extends between the blade support portion and the intermediate portion between the blade distal end and the fixed location, the biasing element biasing the intermediate and blade support portions away from each other.

There may also be provided a cleaning implement wherein the biasing element is prestrained to offer a predetermined resistance to compression of the intermediate and blade support portions towards each other.

There may also be provided a cleaning implement wherein a prestrain stress of the biasing element is selectively adjustable.

There may also be provided a cleaning implement further comprising an extension pole, the handle being mounted to the extension pole.

There may also be provided a cleaning implement wherein the handle is removably mounted to the extension pole.

There may also be provided a cleaning implement wherein the support arm is provided with a clip for clipping a nozzle thereto usable to spray a liquid towards the squeegee blade.

There may also be provided a cleaning implement wherein the squeegee blade and the handle are substantially perpendicular to each other.

There may also be provided a cleaning implement wherein the support arm is removably attachable to the handle.

There may also be provided a cleaning implement wherein the support arm is pivotable relative to the handle about a pivot axis, the pivot axis being angled relative to the handle longitudinal axis, for example about perpendicular thereto.

There may also be provided a cleaning implement wherein the support arm is pivotable relative to the handle about the pivot axis by at least 180 degrees.

Advantageously, the proposed cleaning implement provides a user with a relatively larger margin of error when attempting to apply a substantially uniform pressure on the blade leading edge while sweeping a tall window pane or glass wall, which can imply moving the handle through a large range of angles relative to the surface to be cleaned. This advantage can be particularly appreciated when the cleaning tool is engaged at the end of a long extension pole to accomplish the task. Indeed, small variations in the position of the hands of the user relative to the window will not significantly alter the pressure exerted on the window due to the suspension effect provided by the deformable intermediate portion.

Further advantageously, in some embodiments, a substantially inverted U-shape configuration of the intermediate portion, allows the user to reach relatively more easily the lower edge of the window to be cleaned. This advantage can be particularly appreciated when the cleaning tool is engaged at the end of an extension pole, and the window pane is elevated and recessed in a window opening defined by abutment walls and further partially covered with a protective fence or the like.

This inverted configuration of the cleaning tool can further be particularly appreciated when the handle thereof is directly handled with the hand, in which case the user does not have to bend the wrist as much forwardly to reach the lower edge of the window pane, as would be required when using a conventional handheld cleaning tool. Hence, the wrist muscles of the user can be relatively less strained at the end of a long day's work.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 8, in a side elevational view, illustrates the cleaning implement of FIG. 1, here shown with its blade leading edge reaching the lower edge of a window pane in a recessed window opening partially protected by a fence or the like;

DETAILED DESCRIPTION

Figure 1:
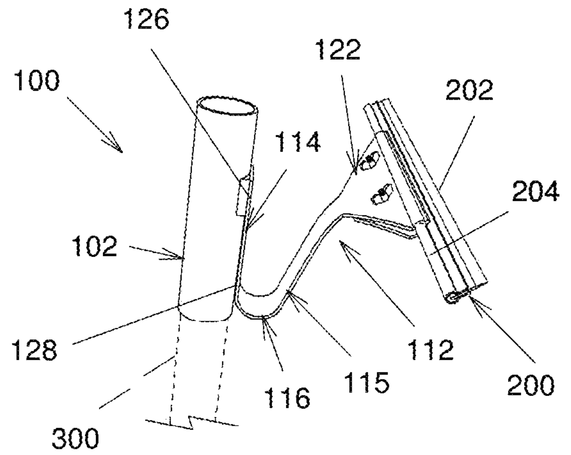
FIG. 1, in a perspective view, illustrates an embodiment of a cleaning implement.
Figure 2:
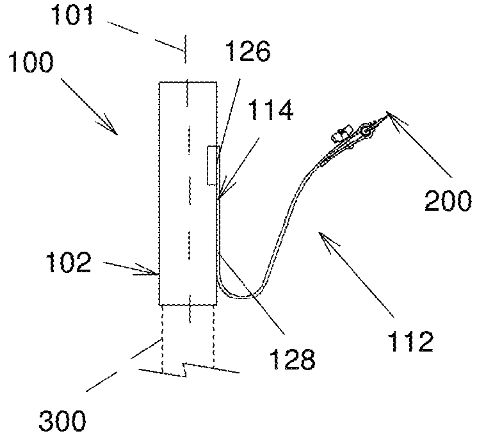
FIG. 2, in a side elevational view, illustrates the cleaning implement of FIG. 1.
Figure 3:
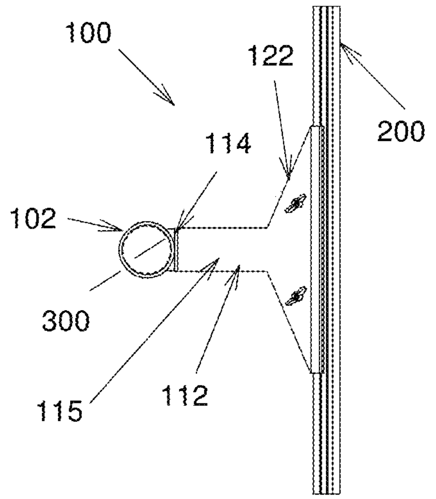
FIG. 3, in a top plan view, illustrates the cleaning implement of FIG. 1.
Figure 4:
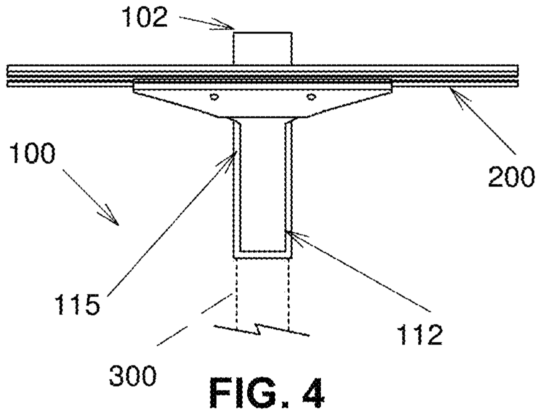
FIG. 4, in a front elevational view, illustrates the cleaning implement of FIG. 1.

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. Also, directional terminology, such as "up" and down", is used with reference to window cleaning in which a squeegee blade is dragged vertically along a window pane. This terminology is used for convenience and should not be used to unduly restrict the scope of the present invention.

Referring collectively to FIGS. 1 to 8 inclusively, there is shown an embodiment of a cleaning implement 100 including a squeegee blade 200 for cleaning a window pane 500 or other similar surfaces. The squeegee blade 200, also referred to in the industry as a wiper blade, is typically substantially elongated and includes a blade leading edge 202, that will contact the window pane 500 in use, and a tool engaging edge 204, typically parallelly spaced apart from the blade leading edge 202.

The cleaning implement 100 also includes a handle 102. The handle 102 typically has a substantially elongated configuration and defines a handle longitudinal axis 101. The handle 102 defines a handle proximal end 104 and a handle distal end 106 longitudinally spaced apart from the handle proximal end 104. The handle proximal end 104 is in some embodiments adapted for user selectively engaging therewith a distal end portion 302 of an extension pole 300, removably therefrom or not. Therefore, in the context of the handle, the handle distal end 106 is further away from a user of the cleaning implement 100 than the handle proximal end 104 when the handle 102 is mounted to the extension pole 300 and the latter is held opposed to the handle 102 so as to reach locations that are too high to reach without the extension pole 300. The handle 102 further defines a handle forward longitudinal surface 110 extending along one longitudinal side of the handle 102. The user may selectively maneuver the handle 102 of the cleaning implement 100 directly with his hand or through an extension pole 300.

Figure 5:
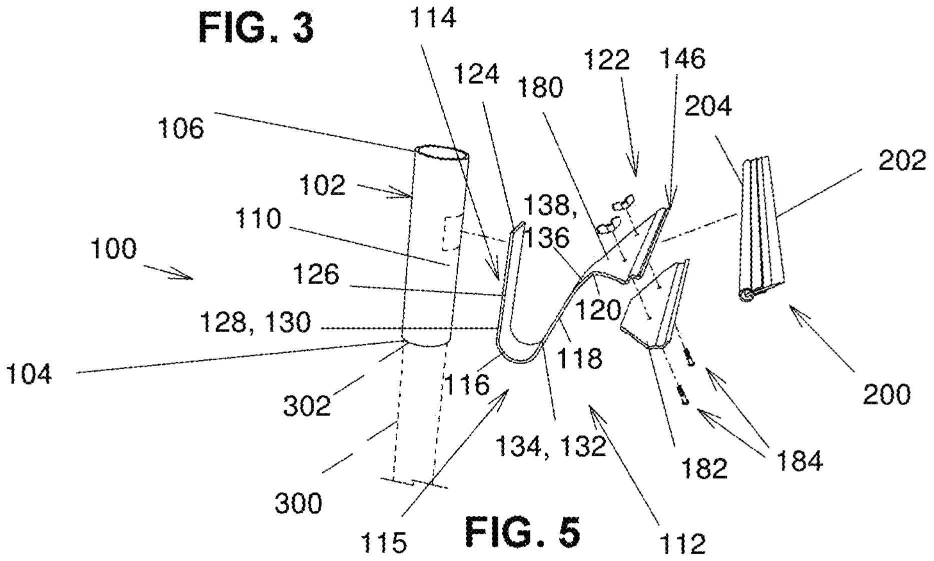
FIG. 5, in a perspective, exploded view, illustrates the cleaning implement of FIG. 1.

Referring now more particularly to FIG. 5, the cleaning implement 100 further comprises a support arm 112. The support arm 112 extends between the squeegee blade 200 and the handle 102 and supports the squeegee blade 200 spaced apart from the handle 102. As further described below, the support arm 112 is resiliently deformable so that the squeegee blade 200 is movable relative to the handle 102 so that a distance between the handle 102 and the squeegee blade 200 varies when the support arm 112 deforms. The variations in distance between the support arm 112 and the handle 102 may be between 2 and 5 mm, between 2 and 10 mm, between 1 and 20 mm, or between 1 and 30 mm in use, for example, although other distance variations are within the scope of the invention. These variations are to be contrasted by the very small variations that may occur in known squeegee blade, for example of the order of microns, due to the inherent compressibility of all materials. The compressibility of the support arm 112, as measured in a direction perpendicular to the handle longitudinal axis 101 and extending in a common plane with the support arm 112, is in some embodiments between 0.1 and 10 times the compressibility of the squeegee blade 200, or between 0.01 and 100 times the compressibility of the squeegee blade 200 in the same direction. In another manner of describing the relative rigidity of the squeegee blade 200 and the support arm 112, a distance variation between the blade leading edge 202 and the handle 102 in use, when the blade leading edge 202 is pressed against a surface using the handle 102, is due from about 10% to about 90% or from about 1% to about 99% to the deformation of the support arm, with substantially all of the remainder of this distance variation being due to the deformation of the squeegee blade 200.

The support arm 112 includes a handle mounting portion 114 extending from the handle 102, a blade support portion 122, the squeegee blade 200 being mounted to the blade support portion 122, and an intermediate portion 115 extending therebetween. The intermediate portion 115 including a bend 116. Typically, the handle mounting portion 114 has a substantially elongated rectilinear configuration and includes an attached section 126 fixedly mounted to the handle 102 at the handle forward longitudinal surface 110 between the handle proximal and distal ends 104 and 106, typically closer to the handle distal end 106 than the handle proximal end 104. The handle mounting portion 114 further includes a detached section 128 extending from the attached section 126. The detached section 128 is movable away from the handle 102 with the attached section 126 remaining attached to the handle 102 by deforming the handle mounting portion 114. The detached section 128 is closer to the handle proximal end 104 than the handle distal end 106 and the intermediate portion extends from the detached section 128. In some embodiments the handle 102 is substantially cylindrical and the handle mounting portion 114 is substantially rectilinear and extends longitudinally downwardly parallelly relative to the handle forward longitudinal surface 110. A handle mounting portion upper end 124 is defined opposed to the bend 116.

The support arm 112 includes the bend 116 in the intermediate portion 115. The bend 116 is referred hereinbelow as "the arm first bend" as in some embodiments, two bend are present in the support arm 112. However, support arms 112 in which only the arm first bend 116 is present are possible. The arm first bend 116 includes a first bend proximal end 130 at the end of the detached section 128 and a first bend distal end 132 extending substantially upwardly and forwardly relative to a nadir of the arm first bend 116.

The intermediate portion 115 further includes an elongated intermediate portion segment 118. The intermediate portion segment 118 has a substantially elongated configuration and includes an intermediate portion proximal end 134 connected to the first bend distal end 132 and an intermediate portion distal end portion 136 extending substantially upwardly and at least slightly diverging away from the handle forward longitudinal surface 110. The intermediate portion distal end portion 136 is terminating at the intermediate portion segment distal end 138.

The support arm 112 further includes an arm second bend 120. The arm second bend 120 curves in a direction opposite to the arm first bend 116. In the embodiment shown in the drawings, the arm first bend 116 is concave upwardly.

The blade support portion 122 extends from the arm second bend 120 and defines a blade support distal end portion 146 engaging the tool engaging edge 204 of the squeegee blade 200. The blade support portion 122 is suitably sized and shaped such that the squeegee blade 200 extends substantially transversally perpendicularly centrally relative to the handle forward longitudinal surface 110, with the blade leading edge 202 thereof extending substantially distally forwardly upwardly. The blade support and intermediate portions 122 and 115 are angled relative to each other at their junction. Typically, the squeegee blade 200 is removably mounted to the blade support portion 122.

The support arm 112 is made of a substantially rigid, yet at least slightly resiliently flexible material, so as to provide a spring biased action when the handle mounting portion upper end 124 and the squeegee blade 200 are at least slightly forced substantially one towards the other.

Figure 6:
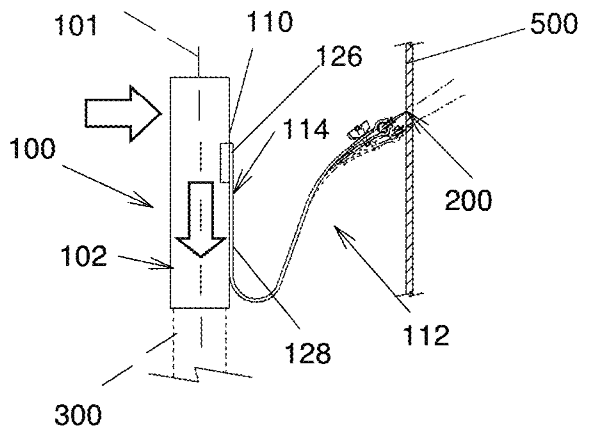
FIG. 6, in a side elevational view, illustrates the cleaning implement of FIG. 1, here shown pressed towards a window pane to be cleaned.
Figure 7:
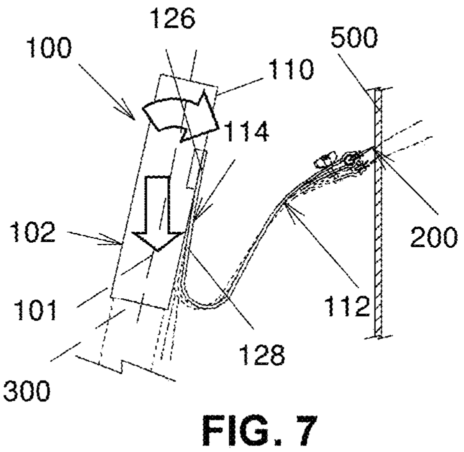
FIG. 7, in a side elevational view, illustrates the cleaning implement of FIG. 6, here shown further pressed at a different angle against the window pane to be cleaned.

Referring more particularly to FIG. 6, the support arm 112 is suitably shaped and sized such that, with the handle 102 substantially parallelly spaced apart relative to the window pane 500 to be cleaned, and the blade leading edge 202 parallelly contacts the surface thereof, if the handle 102 is pushed at least slightly laterally parallelly towards the window pane 500, the detached section 128 remains substantially parallelly in abutment against the handle forward longitudinal surface 110. Furthermore, the arm first bend 116 at least slightly bends inwardly such that the forward remaining portion of the cleaning implement 100 is biased relatively closer to the handle forward longitudinal surface 110. Referring now more particularly to FIG. 7, with the handle distal end 106 further pushed at least slightly closer to the window pane 500 relative to the handle proximal end 104, the detached section 128 is at least slightly bent such that part thereof is at least slightly moved away from the handle forward longitudinal surface 110.

Therefore, the support arm 112 is movable between an unstressed configuration, a first deformed configuration, and a second deformed configuration. The unstressed configuration is shown in dashed lines in FIGS. 6 and 7. The unstressed configuration is achieved in the absence of external forces on the cleaning implement 100. In the first deformed configuration, seen in FIG. 6, the detached section 128 abuts against the handle 102 and the intermediate portion 115 is deformed relative to the unstressed configuration so that the squeegee blade 200 is closer to the handle longitudinal axis 101 than in the unstressed configuration. In the second deformed configuration, seen in FIG. 7, the detached section 128 is at least in part spaced apart from the handle 102 and the intermediate portion 115 is deformed relative to the unstressed configuration so that the blade leading edge 202 is closer to the handle longitudinal axis 101 than in the unstressed configuration.

Thus, the selective deformation and biasing of the support arm 112 relative to the angle of the handle 102 with respect of the window pane 500, when the handle 102 is pushed or forced towards the latter, provides a means to absorb the variation of the force applied by the user on the cleaning implement 100 when the cleaning implement 100 is moved at different angle along the surface to be cleaned.

Thus, when maneuvering the cleaning implement 100, a user may relatively easily apply a substantially uniform pressure on the blade leading edge 202 abutting against the window pane 500 to be cleaned substantially independently of the location of the blade leading edge 202 along the surface thereof and the angle of the handle 102 relative to the window pane 500 during, for example, a complete top-down sweeping movement of the cleaning implement 100 thereon.

Advantageously, the cleaning implement 100 of the present invention provides the user with a relatively large margin of error when attempting to apply a substantially uniform pressure on the blade leading edge 202 while sweeping a tall window pane 500 or glass wall, which can imply moving the handle 102 through a large range of angles relative to the surface to be cleaned. This advantage can be particularly appreciated when the cleaning implement 100 is engaged at the end of a long extension pole 300 to accomplish the task.

Further advantageously, the substantially U shaped configuration of the support arm 112 of the cleaning implement 100, mainly defined by the portion of the support arm 112 extending away from the handle 102 at the handle proximal end 104 of the cleaning implement 100 rather than typically from the top of the handle as is usually the case in known window cleaning implements of the prior art, allows the user to reach relatively more easily the lower edge 510 of the window to be cleaned.

Figure 8:
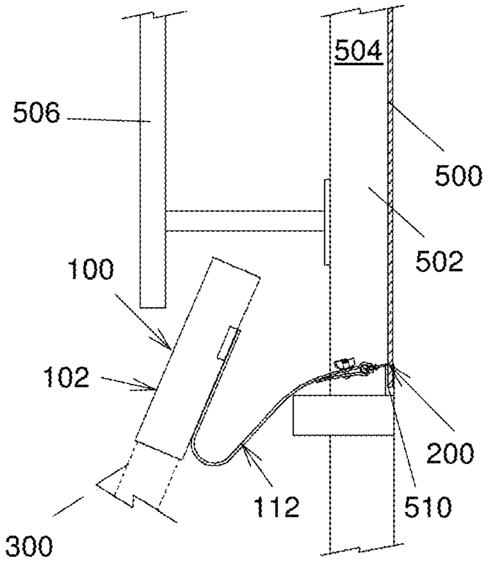

As exemplified in FIG. 8, this advantage can be particularly appreciated when the cleaning implement 100 is engaged at the end of an extension pole 300, and the window pane 500 is elevated and recessed in a window opening 502 defined by abutment walls 504 and further partially covered with a protective fence 506 or the like.

This configuration of the cleaning implement 100 can further be particularly appreciated when the handle 102 thereof is directly maneuvered with the hand, in which case the user does not have to bend the wrist as much forwardly to reach the lower edge 510 of the window pane 500, as would be required when using a handheld cleaning implement of the prior art. Hence, the wrist muscles of the user can be relatively less strained at the end of a long day's work.

In some embodiments, the arm first bend 116 is located substantially laterally in register with the handle proximal end 104. Other positions of the arm first bend 116 relative to the handle proximal end 104 are also possible. In some embodiments, the support arm 112 and blade support portion 122 are suitably sized and shaped such that the blade leading edge 202 is located substantially laterally in register with the handle distal end 106. Other positions of the blade leading edge 202 relative to the handle distal end 106 are also possible. For example, the blade leading edge 202 may be located at a relative position that is at least slightly higher than to the handle distal end 106, as illustrated in FIG. 9, or lower relative thereto.

In some embodiments of the cleaning implement 100, the bend 116 has a substantially rounded bend configuration, as illustrated throughout the figures. In other embodiments of the cleaning implement 100 (not shown in the figures), the bend 116 has a substantially V-shaped configuration. In yet other embodiments of the cleaning implement 100 (not shown in the figures), the bend 116 further includes a hinge having a transversally laterally extending pivot axis relative to the handle forward longitudinal surface 110, and a compression spring element arranged between the two segments that are hinged to each other to provide the resilient deformation of the support arm 112.

Figure 9:
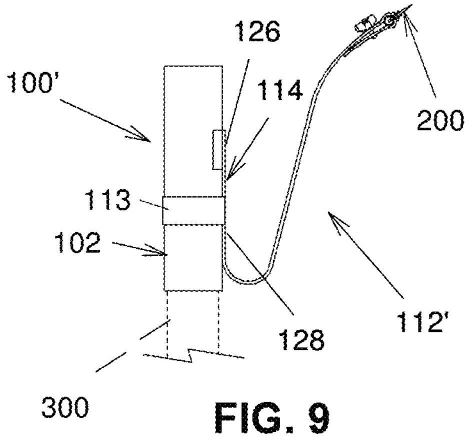
FIG. 9, in a side elevational view, illustrates another embodiment of a cleaning implement.

Referring to FIG. 9, in some embodiments, the cleaning tool 100' further comprises a lock movable along the handle mounting portion 114 to selectively adjust a length of the detached section 128 by maintaining the handle mounting portion 114 and the handle 102 adjacent to each other at the lock. For example, the lock takes the form of an annular member 113 suitably sized and shaped so as to coaxially and slidably resiliently engage the handle 102 cooperatively with the handle mounting portion 114.

The annular member 113 is user selectively slidably adjustable longitudinally relative to the handle 102 so as to adjust the range of flexibility of the detached section 128 and, hence, the range at which the detached section 128 can distance itself away from the handle forward longitudinal surface 110 of the handle 102. The annular member 113 can be made of any sufficiently rigid material such as, for example, aluminum, a suitable metal alloy, rubber, a suitable polymeric material or the likes.

Figure 11:
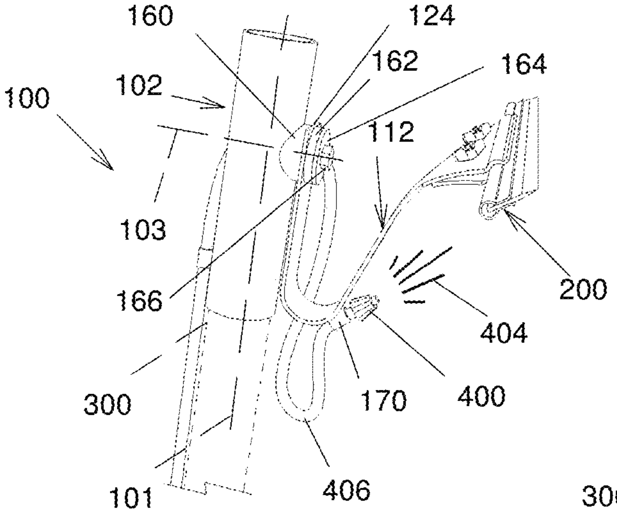
FIG. 11, in a perspective view, illustrates yet another embodiment of a cleaning implement.
Figure 12:
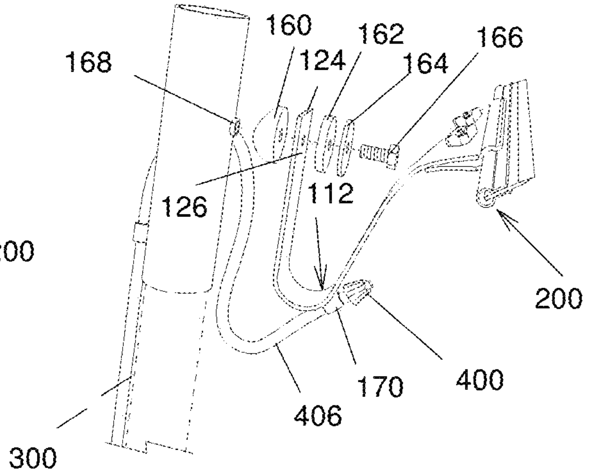
FIG. 12, in a perspective partially exploded view, illustrates the cleaning implement of FIG. 11.
Figure 13:
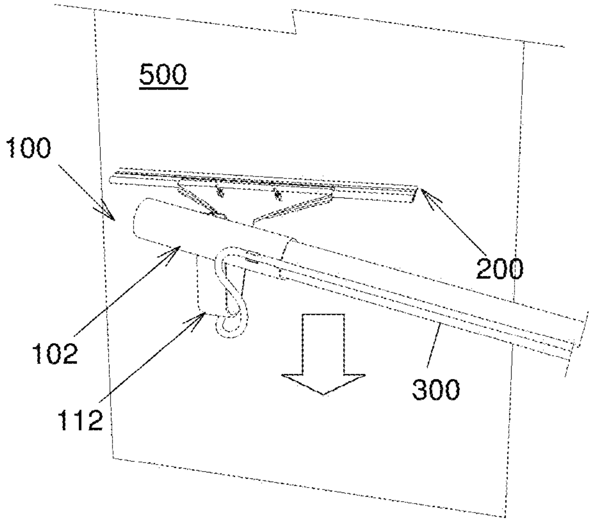
FIG. 13, in a rear perspective view, illustrates the cleaning implement of FIG. 11, here shown with a squeegee blade and handle thereof rotated relative to each other with respect to the configuration of FIG. 11.

Referring to FIGS. 11 to 13 inclusively, in some embodiments, the cleaning tool 100" includes a support arm 112 that is pivotable relative to the handle 102 about a pivot axis 103, the pivot axis 103 being angled relative to the handle longitudinal axis 101. More specifically, the attached section 126 is pivotably mounted to the handle 102 through a friction pivot pin arrangement having a pivot axis 103 extending for example substantially perpendicularly relative to the handle forward longitudinal surface 110. The pivot pin arrangement is adapted for allowing a user to manually rotate and resiliently maintain by friction force at a user selected angle the support arm 112 relative to the handle 102.

Advantageously, as exemplified in FIG. 13, with the cleaning implement 100 engaged at the end of an extension pole 300, a user may relatively easily reach and clean an elevated window pane 500 located laterally away from a balcony or the like, thus avoiding the time consuming use of a ladder or a very long and heavy extension pole. Furthermore, in some embodiments, the support arm 112 can be pivoted 180 degrees with respect to the configuration shown in FIG. 1 and be used to clean glass panel railing and other similar structures below the hands of an intended user. More specifically, even with the hands of the user of the cleaning implement 100 above the structure to clean, downward swiping movements of the squeegee blade 200 can be performed relatively easily.

For example, as exemplified in FIGS. 11 and 12, the pivot pin arrangement may typically include a base member 160 connected to the handle 102, an intermediate member 162, a rigid member 164 and a threaded bolt element 166 extending through axially corresponding apertures defined centrally through the members 160, 162, 164, and support arm 112 for engagement in a threaded bore 168 provided along the handle forward longitudinal surface 110, such that the support arm 112 is located between the base member 160 and the intermediate member 162 at the handle mounting portion upper end 124.

The base member 160 and intermediate member 162 may be made of rubber, felt, or other equivalent resilient material offering friction qualities. The threaded bolt 166 may be used to adjust the friction level applied between the handle 102 and the support arm 112. Other known equivalent friction pivot pin arrangements are also possible.

In some other embodiments of the cleaning implement 100 (not shown in the figures), the support arm 112 is pivotably connected to the handle 102 through a freely rotating pivot pin arrangement having a pivot axis extending substantially perpendicularly relative to the handle forward longitudinal surface. The freely rotating pivot pin arrangement may include a rotation coil spring element suitably arranged between the handle 102 and the support arm 112 so as spring return the support arm 112 parallel relative to the handle 102.

In some embodiments, as in the cleaning implement 100", a liquid nozzle holder 170, or clip, is provided along a surface portion the support arm 112. As exemplified in FIGS. 11 to 13, the liquid nozzle holder 170 may be suitably connected along an underside surface portion of the bend 116 and adapted to hold a liquid nozzle 400 so as to direct a spray of liquid 404 on a surface portion the window pane 500 adjacently below the blade support portion 122. In some other embodiments of the cleaning implement 100 (not shown in the figures), the angle of projection of the liquid nozzle holder 170 is user selectively adjustable so as to direct the spray of liquid 404 at a user selected surface portion of the window pane 500. In yet some other embodiments of the cleaning implement 100 (not shown in the figures), the position of the liquid nozzle holder 170 along the support arm 112 is user selectively adjustable through, for example, an attachment element such as a rubber loop, a Velcro® band or a releasable clamp element. The liquid nozzle 400 may be operatively connected in fluid communication through suitable tubing 406 with a manually or motor powered pump and liquid container assembly providing pressurized window cleaning fluid at the liquid nozzle 400.

Figure 14:
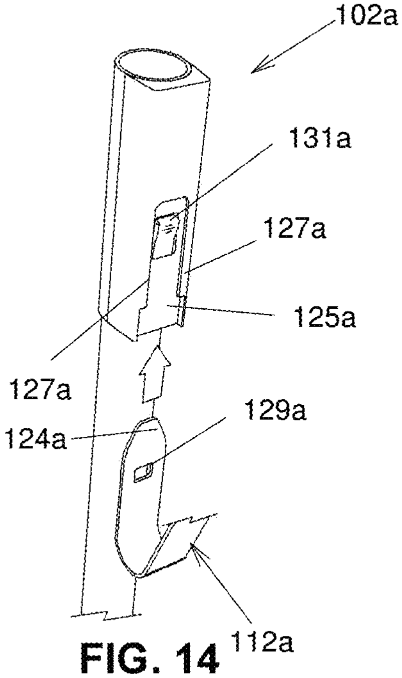
FIG. 14, in a partial perspective view, illustrates an alternative manner of attaching to each other a support arm and a handle in a cleaning implement.

In other embodiments, as seen in FIG. 14, the support arm 112*a* is removably attachable to the handle 102*a*. For example, the support arm 112*a* and handle 102*a* can be joined to each other by inserting the handle mounting portion upper end 124*a* in a suitable recess 125*a* formed in the handle 102*a*. The recess 125*a* is partially closed by lips 127*a* that prevent movements of support arm 112*a* away from the handle longitudinal axis 101 and is opened downwardly so that the support arm 112*a* can be inserted in the recess 125*a* and removed therefrom longitudinally. The support arm 112 defines an aperture 129*a* extending therethrough and the handle 102*a* is provided with a push button 131*a* insertable in the aperture 129*a* and biased laterally outwardly. Thus, when the support arm 112*a* is slid in the recess 125*a* and the push button 131*a* is pushed into the handle 102*a*, the support arm 112*a* can be inserted in the recess 125*a* until the push button 131*a* is in register with the recess 129*a*, at which point the push button 131*a* protrudes from the recess 129*a*. Typically, the push button 129*a* is configured so that removal of the support arm 112*a* from the recess 125*a* is then prevented unless the push button 129*a* is pushed into the handle 102*a* so as to completely clear the support arm 112*a*.

In some embodiments of the cleaning implement 100 (not shown in the figures), the squeegee blade 200 is integrally formed with the blade support portion 122. In other embodiments, the squeegee blade 200 is replaceable and the blade support portion 122 is suitably adapted for releasably receiving the squeegee blade 200.

For example, as best exemplified in FIG. 5, the blade support portion 122 may include an upper and a lower jaw member 180 and 182 respectively. The upper jaw member 180 extends from the arm second bend 120, and the lower jaw member 182 is adjustably engaged with the upper jaw member 180 through a pair of threaded bolt and wing nut combinations 184 extending transversally through, and in spaced apart relationship, both the upper and lower jaw members 180 and 182.

The upper and lower jaw members 180 and 182 are suitably adapted for releasably engaging the tool engaging edge 204 of the replaceable squeegee blade 200. Such replaceable squeegee blade 200 are widely available commercially. Other known arrangements of the blade support portion 122 are also possible for releasably connecting the blade support portion 122 with the replaceable squeegee blade 200.

Figure 10:
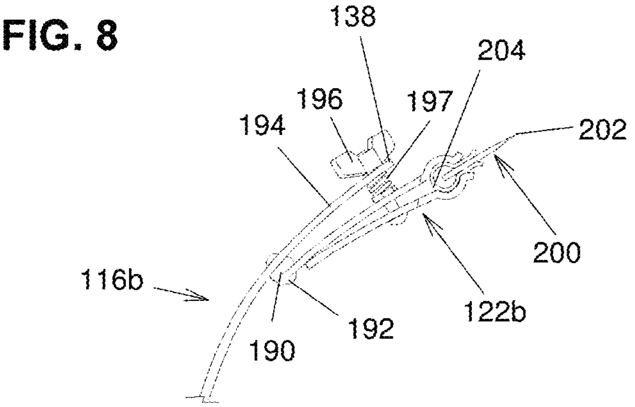
FIG. 10, in a partial side elevational view, illustrates yet another embodiment of a cleaning implement.

In some embodiments of the cleaning implement 100, as illustrated in FIG. 10, here shown in combination with a releasable blade support portion 122*b*, the blade support portion 122*b* is hinged to the intermediate portion 116*b* and movable relative thereto over a predetermined movement range. A biasing element 197 is provided between the blade support portion 122*b* and the intermediate portion 116*b* to bias the blade support portion 122*b* towards an end point of the predetermined movement range. In some embodiments, the predetermined movement range is selectively adjustable.

More specifically, the blade mounting portion 122*b* and the intermediate portion 116*b* overlap each other along part thereof adjacent the intermediate portion segment distal end 138. The blade support portion 122*b* is fixed relative to the intermediate portion 116*b* at a fixed location 142 spaced apart from the intermediate portion segment distal end 138. The blade support portion 122*b* and the intermediate portion 116*b* are movable relative to each other at the intermediate portion segment distal end 138. The biasing element 197 extends between the blade support portion 122*b* and the intermediate portion 116*b* between the intermediate portion segment distal end 138 and the fixed location and biases the intermediate and blade support portions 116*b* and 122*b* away from each other.

In some embodiments, the biasing element 197 is prestrained to offer a predetermined resistance to compression of the intermediate and blade support portions towards each other 116*b* and 122*b*. That is, the biasing element 197 is compressed even in the absence of external forces on the cleaning implement. Therefore, unless the predetermined resistance is reached, the intermediate and blade support portions 116*b* and 122*b* will remain fixed relative to each other. Once the predetermined resistance is reached, if the prestrain and compressibility of the biasing element 197 are suitably selected, relatively small movements of the handle 302 will not result in large variations in the force exerted by the blade leading edge 202 on the surface on which it is used. In some embodiments, a prestrain stress of the biasing element is selectively adjustable.

To that effect, the blade support portion proximal end portion is connected to the intermediate portion 116*b*, for example at the second bend, through a holder pivotable connection 190 such as, for example, a flexible element made of a resilient material compressed between the blade support portion proximal end portion and the second bend distal end 142 through a rivet attachment element 192, or the like.

The blade support portion 122*b* is connected to a forward extended portion 194 of the second bend distal end 142 through a user adjustable spring biased arrangement 196. The user adjustable spring biased arrangement 196 includes a pair of threaded bolt, compression spring (embodying the biasing element 197) and wing nut combinations transversally extending through in a spaced apart relationship blade support portion 122.

The pair of threaded bolt, compression spring and wing nut combinations are adapted for allowing the user to finely adjust the pressure level at which the blade support portion 122 is biased substantially rearwardly towards the handle 102 when the blade leading edge 202 is pressed against the window pane 500 to be cleaned.

The handle 102, the support arm 112 and the blade support portion 122 can be made of any sufficiently rigid material, with the support arm 112 being at least slightly flexible. In some embodiments, the handle 102, the support arm 112 and the blade support portion 122 are made of aluminum. In some embodiments, the support arm 112 is made of one continuous flat strip of material shaped and sized to act substantially as a leaf spring member.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A cleaning implement, comprising:

an elongated squeegee blade;

a handle; and a support arm extending between the squeegee blade and the handle, the support arm supporting the squeegee blade spaced apart from the handle;

wherein the support arm is resiliently deformable so that the squeegee blade is movable relative to the handle, a distance between the handle and the squeegee blade varying when the support arm deforms;

wherein the support arm includes a handle mounting portion extending from the handle, a blade support portion, the squeegee blade being mounted to the blade support portion, and an intermediate portion extending therebetween, the intermediate portion including a bend;

wherein the handle is elongated and defines longitudinally opposed handle proximal and distal ends, a handle longitudinal longitudinal axis extending between the handle proximal and distal ends, the handle mounting portion extending along the handle, the handle mounting portion including an attached section and a detached section extending therefrom, the attached section being secured to the handle at a mounting location and the detached section being movable away from the handle with the attached section remaining attached to the handle by deforming the handle mounting portion, the detached section being closer to the handle proximal end than the mounting location, the intermediate portion extending from the detached section; and wherein the support arm is movable between an unstressed configuration, a first deformed configuration, and a second deformed configuration, wherein the unstressed configuration is achieved in the absence of external forces on the window cleaning implement;

in the first deformed configuration, the detached section abuts against the handle and the intermediate portion is deformed relative to the unstressed configuration so that the squeegee blade is closer to the handle longitudinal axis than in the unstressed configuration; and in the second deformed configuration, the detached section is at least in part spaced apart from the handle and the intermediate portion is deformed relative to the unstressed configuration so that the squeegee blade is closer to the handle longitudinal axis than in the unstressed configuration.

2. The cleaning implement as defined in claim 1, wherein the handle mounting portion is substantially rectilinear.

3. The cleaning implement as defined in claim 1, wherein the support portion includes a section that is at an angle relative to the intermediate portion.

4. The cleaning implement as defined in claim 1, further comprising a lock movable along the handle mounting portion to selectively adjust a length of the detached section by maintaining the handle mounting portion and the handle adjacent to each other at the lock.

5. The cleaning implement as defined in claim 1, wherein the squeegee blade is removably mounted to the blade support portion.

6. The cleaning implement as defined in claim 1, wherein the blade support portion is hinged to the intermediate portion and movable relative thereto over a predetermined movement range, a biasing element being provided between the blade support portion and the intermediate portion to bias the blade support portion towards an end point of the predetermined movement range.

7. The cleaning implement as defined in claim 6, wherein the predetermined movement range is selectively adjustable.

8. The cleaning implement as defined in claim 1, wherein the intermediate portion defines an intermediate portion distal end and an intermediate portion proximal end;

the blade support portion and the intermediate portion partially overlap;

the blade support portion is fixed relative to the intermediate portion at a fixed location spaced apart from the intermediate portion distal end;

the blade support portion and the intermediate portion are movable relative to each other at the intermediate portion distal end; and a biasing element extends between the blade support portion and the intermediate portion between the blade distal end and the fixed location, the biasing element biasing the intermediate and blade support portions away from each other.

9. The cleaning implement as defined in claim 8, wherein the biasing element is prestrained to offer a predetermined resistance to compression of the intermediate and blade support portions towards each other.

10. The cleaning implement as defined in claim 9, wherein a prestrain stress of the biasing element is selectively adjustable.

11. The cleaning implement as defined in claim 1, further comprising an extension pole, the handle being mounted to the extension pole.

12. The cleaning implement as defined in claim 11, wherein the handle is removably mounted to the extension pole.

13. The cleaning implement as defined in claim 1, wherein the support arm is provided with a clip for clipping a nozzle thereto usable to spray a liquid towards the squeegee blade.

14. The cleaning implement as defined in claim 1, wherein the squeegee blade and the handle are substantially perpendicular to each other.

15. The cleaning implement as defined in claim 1, wherein the support arm is removably attachable to the handle.

16. The cleaning implement as defined in claim 1, wherein the support arm is pivotable relative to the handle about a pivot axis, the pivot axis being angled relative to the handle longitudinal axis.

17. The cleaning implement as defined in claim 16, wherein the support arm is pivotable relative to the handle about the pivot axis by at least 180 degrees.

18. A cleaning implement, comprising:

an elongated squeegee blade;

a handle; and a support arm extending between the squeegee blade and the handle, the support arm supporting the squeegee blade spaced apart from the handle;

wherein the support arm is resiliently deformable so that the squeegee blade is movable relative to the handle, a distance between the handle and the squeegee blade varying when the support arm deforms;

wherein the support arm includes a handle mounting portion extending from the handle, a blade support portion, the squeegee blade being mounted to the blade support portion, and an intermediate portion extending therebetween, the intermediate portion including a bend;

wherein the handle is elongated and defines longitudinally opposed handle proximal and distal ends, a handle longitudinal longitudinal axis extending between the handle proximal and distal ends, the handle mounting portion extending along the handle, the handle mounting portion including an attached section and a detached section extending therefrom, the attached section being secured to the handle at a mounting location and the detached section being movable away from the handle with the attached section remaining attached to the handle by deforming the handle mounting portion, the detached section being closer to the handle proximal end than the mounting location, the intermediate portion extending from the detached section;

the cleaning implement further comprising a lock movable along the handle mounting portion to selectively adjust a length of the detached section by maintaining the handle mounting portion and the handle adjacent to each other at the lock.

19. A cleaning implement, comprising:

an elongated squeegee blade;

a handle; and a support arm extending between the squeegee blade and the handle, the support arm supporting the squeegee blade spaced apart from the handle;

wherein the support arm is resiliently deformable so that the squeegee blade is movable relative to the handle, a distance between the handle and the squeegee blade varying when the support arm deforms;

wherein the support arm includes a handle mounting portion extending from the handle, a blade support portion, the squeegee blade being mounted to the blade support portion, and an intermediate portion extending therebetween, the intermediate portion including a bend; and wherein the blade support portion is hinged to the intermediate portion and movable relative thereto over a predetermined movement range, a biasing element being provided between the blade support portion and the intermediate portion to bias the blade support portion towards an end point of the predetermined movement range.

20. The cleaning implement as defined in claim 19, wherein the predetermined movement range is selectively adjustable.

21. A cleaning implement, comprising:

an elongated squeegee blade;

a handle; and a support arm extending between the squeegee blade and the handle, the support arm supporting the squeegee blade spaced apart from the handle;

wherein the support arm is resiliently deformable so that the squeegee blade is movable relative to the handle, a distance between the handle and the squeegee blade varying when the support arm deforms; and wherein the support arm is provided with a clip for clipping a nozzle thereto usable to spray a liquid towards the squeegee blade.

22. A cleaning implement, comprising:

an elongated squeegee blade;

a handle; and a support arm extending between the squeegee blade and the handle, the support arm supporting the squeegee blade spaced apart from the handle;

wherein the support arm is resiliently deformable so that the squeegee blade is movable relative to the handle, a distance between the handle and the squeegee blade varying when the support arm deforms;

wherein the support arm includes a handle mounting portion extending from the handle, a blade support portion, the squeegee blade being mounted to the blade support portion, and an intermediate portion extending therebetween, the intermediate portion including a bend;

wherein the handle is elongated and defines longitudinally opposed handle proximal and distal ends, a handle longitudinal longitudinal axis extending between the handle proximal and distal ends, the handle mounting portion extending along the handle, the handle mounting portion including an attached section and a detached section extending therefrom, the attached section being secured to the handle at a mounting location and the detached section being movable away from the handle with the attached section remaining attached to the handle by deforming the handle mounting portion, the detached section being closer to the handle proximal end than the mounting location, the intermediate portion extending from the detached section; and wherein the support arm is pivotable relative to the handle by at least 180 degrees about a pivot axis, the pivot axis being angled relative to the handle longitudinal axis.

23. A cleaning implement, comprising:

an elongated squeegee blade;

a handle; and a support arm extending between the squeegee blade and the handle, the support arm supporting the squeegee blade spaced apart from the handle;

wherein the support arm is resiliently deformable so that the squeegee blade is movable relative to the handle, a distance between the handle and the squeegee blade varying when the support arm deforms;

wherein the support arm includes a handle mounting portion extending from the handle, a blade support portion, the squeegee blade being mounted to the blade support portion, and an intermediate portion extending therebetween, the intermediate portion including a bend;

wherein the intermediate portion defines an intermediate portion distal end and an intermediate portion proximal end;

the blade support portion and the intermediate portion partially overlap;

the blade support portion is fixed relative to the intermediate portion at a fixed location spaced apart from the intermediate portion distal end;

the blade support portion and the intermediate portion are movable relative to each other at the intermediate portion distal end; and a biasing element extends between the blade support portion and the intermediate portion between the blade distal end and the fixed location, the biasing element biasing the intermediate and blade support portions away from each other.

24. The cleaning implement as defined in claim 23, wherein the biasing element is prestrained to offer a predetermined resistance to compression of the intermediate and blade support portions towards each other.

25. The cleaning implement as defined in claim 24, wherein a prestrain stress of the biasing element is selectively adjustable.

* * * * *